Figures 1, 2:
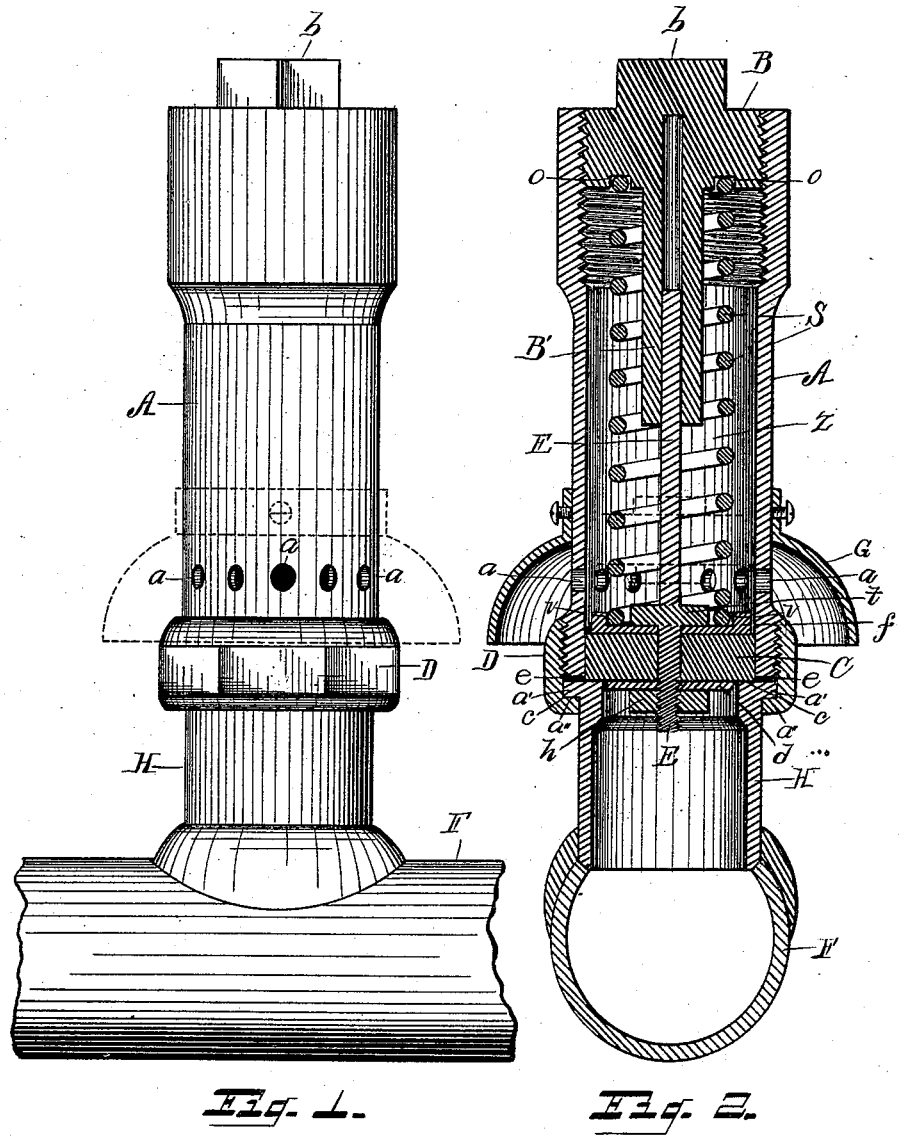

(No Model.)

E. MARTYN.
RELIEF VALVE.

No. 429,632. Patented June 10, 1890.

WITNESSES
C. Wheeler
R. B. Wheeler

INVENTOR
Edward Martyn
By
Roscoe B. Wheeler
Attorney.

UNITED STATES PATENT OFFICE.

EDWARD MARTYN, OF DETROIT, MICHIGAN.

RELIEF-VALVE.

SPECIFICATION forming part of Letters Patent No. 429,632, dated June 10, 1890.

Application filed January 6, 1890. Serial No. 336,092. (No model.)

*To all whom it may concern:*

Be it known that I, EDWARD MARTYN, a citizen of the United States, residing at Detroit, in the county of Wayne and State of Michigan, have invented certain new and useful Improvements in Relief-Valves; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to automatic relief or safety valves for water-pipes; and it consists in a certain construction and arrangement of parts whereby the pressure of water in the pipes of a water-supply system may be regulated, so as to avoid the bursting of the main pipes of the system or the lead supply-pipes leading therefrom by a suddenly-increased water-pressure in said pipes, which will be hereinafter fully set forth, and the essential features of the device pointed out particularly in the claims.

In the accompanying drawings, forming a part of this specification, Figure 1 is a side elevation of my improved device. Fig. 2 is a central vertical section through Fig. 1.

Referring to the letters of reference, A indicates the valve-case, having the chamber Z; C, the valve, and S a coiled spring located within the valve-chamber and bearing upon the valve.

F indicates the water-supply pipe, and H a coupling attached to the supply-pipe, and on which the valve-case is mounted, and which connects said case with the supply-pipe. The coupling H is attached to the supply-pipe F in the ordinary manner of making such connection. The upper end of the coupling H is provided with the loose sleeve D, which is internally screw-threaded to receive the externally-threaded end of the valve-case A. By screwing the sleeve D onto the lower end of said case the shoulder $a''$ of the sleeve engages the flange $a'$ of the coupling H, thereby drawing the end of the case A tightly down upon the gasket $e$, placed between the lower end of said case and the upper face of the flange $a'$, whereby the valve-case is attached to the coupling H and a water-tight joint formed between said case and coupling, as clearly shown in Fig. 2, the outer surface of the sleeve D being octagonal in form, as shown in Fig. 1, to permit of the application of a wrench thereto for turning said sleeve.

The valve-case A is interiorly provided with the valve C and the coiled spring S, and is also provided with the discharge-ports $a$ in the periphery thereof. The valve C snugly fills the inner diameter of the valve-case A and is provided with the valve-stem E. Said stem passes vertically through the center of the washer $f$ and the valve C, the head $t$ on said stem bearing upon the upper face of the washer $f$, and the lower end of the stem receiving the washer $d$ and nut $h$, whereby the valve is securely mounted on said stem, as clearly shown in Fig. 2. The upper end of the valve-case is internally screw-threaded to receive the threaded plug B, which is screwed therein. The hollow stem B' of said plug extends downward into the valve-chamber and receives the upper end of the valve-stem E, which is adapted to slide vertically therein. The upper or outer end of the plug B, having the square head $b$, affords a wrench hold for turning said plug, as in screwing it into or out of the valve-case, for purposes hereinafter described.

The coiled spring S encircles the valve-stem and the hollow stem of the plug B, and is confined between said plug and the valve C, the upper end of the spring lying in the annular groove $o$ in the under face of the plug B, and the lower end of the spring lying within the annular flange $v$ of the washer $f$, whereby said spring is secured in place and is held from frictional contact with the valve-stem and valve-case. The tension of the spring S is increased or decreased by screwing the plug B into or out of the end of the valve-case A, so as to regulate said spring according to the water-pressure in the pipes, the tension maintained being slightly in excess of the ordinary or desired water-pressure, so that the valve C is held upon the valve-seat $c$, formed on the upper end of the coupling H, as clearly shown in Fig. 2. It will now be apparent that an increased water-pressure in the pipes greater than the resisting force of the spring S will compress said spring and raise the valve C in the valve-chamber above the discharge-ports $a$ $a$ in the periphery of the valve-case, as shown by dotted lines in Fig. 2, when the water will flow through said ports, thereby relieving the pressure in the water-pipes, preventing said pipes from bursting. When the escape of water through the discharge-ports $a$ $a$ has reduced the pressure in the pipes to the normal or ordinary pressure, the spring S will force the valve down past the discharge-ports, thus stopping the flow of water therethrough. As the valve is caused to rise and fall in the valve-chamber, the upper end of the valve-stem slides up and down in the hollow stem of the plug B, whereby the valve is guided in its operation and its free and perfect action insured.

This improved relief-valve is adapted to be attached to the lead supply-pipe between the penstock and where said supply pipe taps the main water-pipe, as the lead pipes are the pipes most often burst by a sudden increase of water pressure; but it may be used as a relief-valve for the mains and attached directly thereto.

It will be seen that by the employment of this improved relief-valve attached to the lead supply-pipe a lighter grade of lead piping may be used, as said valve relieves said piping from any severe strain.

The bell-shaped deflector G, secured to the periphery of the valve-case around the discharge-ports $a$, breaks the force of the water flowing through said ports and turns it down, preventing the washing away of the soil, and from said deflector the water may be conveyed to the sewer.

The device may be placed in the ground with a boxing around it, so as to be reached by a wrench to adjust the plug B.

Having thus fully set forth my invention, what I claim as new, and desire to secure by Letters Patent, is—

1. In combination with the coupling H, the valve-case having the series of discharge-ports in the periphery thereof, the gasket and ring uniting the valve-case to said coupling, the plug screw-threaded to the upper end of the valve-case, said plug having the depending hollow stem and annular groove $o$, the valve and valve-stem located in the valve-chamber, and washer $f$ over said valve, the upper end of the valve-stem being loosely fitted in said hollow stem, the coiled spring encircling the hollow stem and the valve-stem, its lower end pressing the valve, its upper end bearing against the plug, as and for the purposes specified.

2. In a device for the purposes set forth, the combination of the coupling having the annular flange $a'$, the valve-case externally screw-threaded at one end and internally screw-threaded at the opposite end, and having the series of discharge-ports near the lower end, the ring and gasket, the plug B, externally screw-threaded and having the hollow stem on its under face and annular groove, the valve, the valve-stem, said valve-stem being loosely supported in the stem of the plug and adapted to travel therein, the spring located in the valve-chamber and around the stem of the plug, and the deflector over the discharge-ports, substantially as specified.

In testimony whereof I affix my signature in presence of two witnesses.

EDWARD MARTYN.

Witnesses:
E. S. WHEELER,
R. B. WHEELER.